United States Patent Office 2,908,671
Patented Oct. 13, 1959

2,908,671
ANTI-FOULING PROCEDURE

Norman N. Hochgraf, Basking Ridge, N.J., Leon Clifford Kenyon, Jr., Baton Rouge, La., and Arthur Walter Langer, Jr., Nixon, N.J., assignors to Esso Research and Engineering Company, a corporation of Delaware No Drawing. Application October 9, 1957
Serial No. 689,036

13 Claims. (Cl. 260—93.7)

This invention relates to the control of film fouling and string polymer formation in polymerization reactors. More particularly it relates to a procedure for minimizing or removing the deposits of fouling material that tend to form on reactor walls in the preparation of solid olefin polymers, particularly polymers of ethylene, propylene and higher alpha olefins prepared with the aid of a catalyst comprising a reducible heavy transition metal compound such as titanium tetrachloride or trichloride plus a reducing compound such as an aluminum trialkyl or aluminum alkyl chloride. It also relates to the elimination of string polymer formation by proper control of the start-up procedure, etc.

It is well known that preparation of macromolecular plastic or rubbery polymers tends to be accompanied by the formation of solid deposits on reactor walls. This tendency has been found to be particularly pronounced in the case of the relatively recent olefin polymerization technique based on the use of a Ziegler catalyst, since here not only the polymer products tend to be quite sticky, but even the catalyst particles themselves tend to adhere to the reactor walls. The ensuing polymer deposit on the reactor walls is of course highly objectionable not only because it reduces the capacity of the vessel, but especially because it interferes with proper heat transfer, may cause plugging of the reactor and otherwise impair the control of the polymerization reaction, and thus results in inferior or non-uniform polymer product quality as well as inefficient plant utilization. Furthermore, this type of polymerization frequently heretofore has been plagued by formation of stringy polymer that interfered with the required stirring mechanism and was otherwise objectionable.

It is an object of the present invention to provide an improved polymerization process and product. A more specific object is to minimize the formation of stringy polymer and of fouling deposits in the polymerization of ethylene, propylene, etc. and to facilitate cleaning reactor surfaces when they become fouled. These and other objects, as well as the nature, operation and advantages of the invention will become apparent from the following description. In the absence of contrary indications it will be understood that all amounts and proportions of materials are expressed on a weight basis throughout.

It has now been discovered that the aforementioned removal of fouling polymer from the reactor walls can be effectively achieved by rapid superheating of the polymerization reactor wall, and more particularly of the internal wall surface, to a temperature in excess of 200° F. for a suitable period of time, e.g. by heating the reactor wall to 200°–400° F. within a period of about 3 to 20 minutes, preferably 5 to 10 minutes. Suitable superheat conditions of course depend somewhat on the size and construction of the reactor, the available heating medium, the heating schedule, the specific composition of the reaction mixture, etc., and can be routinely ascertained from case to case. Generally speaking, for example, in the case of a large-diameter reactor, the walls may be superheated to a greater degree above the normal polymerization temperature than in the case of a small reactor, the main concern being that the temperature of the main bulk of the reaction mixture not be superheated by more than about 50° F. above normal polymerization temperature, e.g. preferably not above about 180° or 200° F. when polymerizing propylene, only the peripheral 2 to 15 volume percent of the agitated reaction mixture being allowed to exceed this temperature during the limited superheat interval. Excessive polymerization temperatures tend to contribute to undesirable formation of string polymer.

For example, when polymerizing propylene at a normal polymerization temperature of 150° F. and a pressure of about 115 p.s.i.a. effective defouling has been obtained when the external steam jacket of the reactor was raised to a temperature of about 200° to 350° F. for about 4 to 10 minutes and then allowing the reactor to cool off again. This raised the internal wall surface temperature to a maximum between about 170° to 200° F. while the reaction mass temperature thus rose initially to 160°–190° F. In such an operation it may take about 15 to 30 minutes from the time the temperature in the main, central part of the reactor first goes above the normal polymerization temperature of 150° F. until it is brought back again to that level for the remainder of the run. During the latter part of the run the jacket temperature will usually be maintained somewhat below the desired polymerization temperature, e.g. at 110° F., in order to remove the excess heat generated by the exothermic nature of the polymerization reaction. In small units the heat loss through the walls to the atmosphere is often sufficient for this purpose. In larger units, however, it is usually necessary to remove the excess heat either by an external heat exchanger, e.g. by passing a coolant through an external jacket, or by refrigerating the feed or at least one of its major components prior to introduction into the reactor, or the needed cooling effect may be obtained by autorefrigeration of the reaction mixture, i.e. by allowing partial evaporation of one of the feed components, e.g. a low boiling diluent such as propane or isopentane. However, by suitable choice of feed temperature, reaction rate, autorefrigeration, etc., it is feasible to operate the external jacket permanently at a temperature above normal polymerization temperature and thus minimize wall fouling throughout an entire run.

If desired, it is possible further to enhance the cleaning action by a rapid but controlled reduction of the pressure in the reactor after the temperature of the reactor wall had been increased as indicated above. By rapidly reducing the pressure to a value where the hot liquid in the fouling coat adjacent the reactor wall is above its boiling point at this reduced pressure while the main body remains below its boiling point, the liquid will flash its superheat and controlled amounts of gas or vapor, e.g. of heptane diluent, can be evolved in and behind the fouling coat. The flashing of the superheated liquid at the reactor wall will strip or peel the fouling polymer from the wall. Of course, the amount of vapor formed can be controlled by the amount of "superheat" applied to the liquid near the walls. At the same time, the bulk of the liquid in the reactor remains undisturbed since the rapid but temporary heating does not cause any significant increase in temperature of the reactor contents except in their peripheral portion.

The rapid raising of the reactor wall temperature to 200° F. or higher is particularly advantageous when it is done shortly after the start-up period during which the reaction mixture was slowly brought up to normal polymerization temperature. After catalyst and monomer are first brought together in a cool reactor and gradually heated, rapid subsequent heating of the reactor walls not only tends to remove any fouling and to pevent further deposition of fouling deposits on the walls but the slow initial warm-up period also minimizes the formation of undesirable stringy polymer in the reaction mass. Stringy polymer tends to form when the reactants are first mixed with each other at reaction temperature. However, the defouling technique described above, with or without pressure reduction, can also be applied during the course of the polymerization process to remove any fouling deposit that may have formed. The high wall temperature appears to melt or cause solvation of the fouling polymer sufficiently so that it can be sloughed off the wall due to the turbulence of the agitated liquid reactor contents.

The invention is of particular usefulness in polymerizing propylene in a slurry system at low pressure and moderate temperature, but is also advantageous when polymerizing ethylene, butene-1, higher alpha-olefins such as heptene-1, conjugated diolefins, such as isoprene, as well as mixtures of any of the foregoing. It is of particular importance when such polymerization is done with the aid of a Ziegler catalyst, i.e. a reducible heavy transistion metal compound of a metal of groups IVB–VIB and VIII in combination with a reducing agent such as an alkyl compound of a group I–III metal, a Grignard reagent, a metal hydride, etc. Titanium tetrachloride or trichloride have been considered as the preferred heavy metal compounds, although zirconium tetrachloride and many other compounds have also been successfully employed. Aluminum trialkyls, notably those containing alkyl groups of 2 to 8 carbon atoms such as triethyl or trioctyl, have been used extensively as the reducing or activating component of the catalyst, though particularly in ethylene polymerization good results have likewise been obtained when using aluminum diethyl chloride, aluminum ethyl sesquichloride, etc. A particularly desirable crystalline catalyst can also be obtained by reducing titanium tetrachloride with hydrogen or metallic aluminum and titanium and then using the thus preformed titanium trichloride in the polymerization in conjunction with an activating amount of aluminum triethyl or the like, e.g. at Al/Ti mole ratios of about 1:1 to 3:1.

At any rate, it will be understood that the catalysts and general polymerization reaction are broadly old and described, for instance, in Belgian Patents 533,362 and 538,782, French Patent 1,135,808, and elsewhere. As there described, the reaction is generally carried out in the presence of an inert diluent, particularly a $C_5$ to $C_{10}$ or higher paraffin, e.g. pentane, n-heptane, a naphthene such as methyl cyclohexane or decalin, or an aromatic hydrocarbon such as xylene or benzene, or a halogenated aromatic hydrocarbon, e.g. chlorobenzene. The polymer product concentration in the reaction mixture is desirably kept between about 2 and 30%, preferably between 5 and 15%. The diluent should of course be sufficiently high boiling to remain in the liquid phase at the polymerization conditions employed.

Neither the polymerization temperature nor the pressure is particularly critical. For example, the polymerization temperature may be in the range of about 30° to 200° F., although temperatures between about 120° and 180° F. are preferred, particularly in the case of the more crystalline $TiCl_3$ catalysts. Pressures may range anywhere from atmospheric or subatmospheric to 250 atmospheres or more, but pressures from atmospheric to about 10 atmospheres are generally sufficient to form the desired solid plastic polymers when an active Ziegler catalyst is used. The reaction pressure may be used to control the concentration of gaseous monomer such as propylene in the reaction mixture. The reaction is preferably carried out under careful exclusion of oxygen, water, carbon dioxide, and similar compounds that are known to poison Ziegler catalysts. The amount of catalyst may vary within wide limits depending on the particular catalyst and kind and purity of monomer as well as diluent. With properly purified feed materials, however, it is normally sufficient to supply the total catalyst (e.g. titanium tetrachloride plus aluminum triethyl) in a proportion of about 0.05 to 0.5 weight percent, preferably 0.10 to 0.25 weight percent, based on total liquid present.

In large scale continuous operation, the polymerization is usually conducted in closed metal vessels provided with internal agitators and an external steam jacket or other external heating and/or cooling means. An autorefrigerative system is also possible. In starting up, it is advantageous first to adjust and stabilize the flow of the several main feed streams, i.e. olefin monomer, hydrocarbon diluent, and optional separate solution of activating amount of aluminum alkyl, before finally starting the actual polymerization reaction by introducing the slurry of active polymerization catalyst suspended in further diluent. The product is also withdrawn in the form of a slurry, the polymer being largely in the form of small granules. The catalyst present in the withdrawn product slurry is then deactivated, e.g. by the addition of an alcohol such as methyl, isopropyl or n-butyl alcohol, with or without a chelating agent such as acetyl acetone, etc. The reaction slurry may then be filtered, the filter cake reslurried in alcohol or other catalyst solvent, refiltered, dried, compacted and packaged.

EXAMPLES

For a better understanding, the invention will now be illustrated by actual operating examples. The reactor used was a 10-gallon cylindrical steel reactor having an inside diameter of about 12 inches and a height of about 24 inches, including rounded heads at top and bottom. The bottom head was demountable by means of a flange. The reactor was provided with a centrally located agitator extending upwardly through the lower head, four feed nozzles spaced 90° apart and extending horizontally into the lower part of the reactor, an outlet at the top, and optionally, internal baffles to increase turbulence. It is important that the active catalyst be injected directly into a well agitated zone. Agitation was such that it provided a central downdraft and upward circulation of liquid along the walls. The cylindrical portion of the reactor was surrounded by a heating jacket adapted for circulation of water or steam, and the entire reactor with the exception of the demountable bottom head was provided with permanent heat insulation; the unjacketed bottom head was supplied with a separate heating coil only in run 5 (see Table I). The reactor had a production capacity of 100 lbs. of solid polymer per day. Of course, other types of reactors provided with heating and cooling means and good agitation can be used similarly.

The catalyst used in all runs was the same and was prepared by the following batch procedure. Aluminum triethyl (95% pure) was made up as a 0.10 molar solution in n-heptane. $TiCl_4$ was made up as a 0.60 molar solution in n-heptane. The heptane was 99+ mol percent pure, stripped with nitrogen to remove both oxygen and water and dried over alumina so as to contain not more than 10 p.p.m. water. The $AlEt_3$ and $TiCl_4$ solutions and additional heptane were added simultaneously with agitation to a closed premix reactor at room temperature, in proportions calculated to give an Al/Ti mole ratio of 0.33 and a total catalyst concentration of 45.5 g./liter. The addition required about 40 minutes, care being taken not to allow the Al/Ti ratio of the mixture to exceed the 0.33 value during the addition, as an excess of the aluminum alkyl would tend to overreduce the titanium tetrachloride to a less desirable form. When all the catalyst ingredients and diluent were added, the mixture was agitated and heated up sharply to a catalyst pretreatment temperature of 280°

F. within a period of 7 to 10 minutes, and held one hour at the pretreatment temperature whereby a slurry of precipitated active catalyst particles was formed. This slurry was rapidly cooled to bring the batch down to room temperature within 10 minutes and the cool catalyst concentrate or slurry was stored in an agitated slurry vessel, whence it was continuously fed to the polymerization reactor as needed.

In carrying out the polymerization, the main feed streams comprised 90 parts n-heptane diluent (purified and dried as above) and 10 parts propylene (technical grade: 97.4% $C_3H_6$, 1.6% $C_3H_8$, 0.15% $C_6H_{14}$, 0.1% $C_5H_{10}$, 0.16% $C_2H_6$, 0.05% $C_2H_4$, 0.05% $CH_4$, 0.12% $CO_2$, 0.12% $N_2$, 0.15% $H_2$, etc.). The reactor was maintained at a normal polymerization temperature of about 150° F., except in run 2 where a temperature of 195° F. was maintained. The normal reaction pressure was kept at about 100 p.s.i.g., so as to retain the propylene in solution in the liquid phase. In addition to diluent and propylene monomer, a supplemental amount of the $AlEt_3$-heptane solution was fed into the reactor in a proportion calculated to raise the Al/Ti mole ratio in the polymerization reactor to 2.0. Total catalyst concentration in the polymerization mixture was maintained at specified values in the range between 0.12 and 0.23 weight percent, as shown in Table I. Actually, however, the active catalyst slurry or concentrate was fed into the polymerization reactor until after the aforementioned main feed streams were lined out on specification rate. Different heating schedules were employed in the several runs during start-up, as shown in Table II below. Of course, polymerization did not begin until after addition of the catalyst concentrate. The normal residence time of the mixture in the reactor was about 0.8 to 0.9 hour.

The polymerized reaction mixture continuously overflowed from the reactor, into a wash tank, was mixed with about 0.3–0.4% of acetyl acetone, then mixed with about 10% of anhydrous isopropanol and agitated for 30 minutes at 150° F. It was then mixed with about 2 vol. of anhydrous isopropanol, agitated for 30 minutes at 150° F., cooled to room temperature, and vacuum filtered. The separated polymer was next reslurried with isopropanol to give a 5% slurry, and filtered, this alcohol reslurry procedure being repeated four times. Finally, the polymer was reslurried in water, vacuum filtered, and dried at 190° F. in an oven swept with nitrogen.

Five separate continuous runs were made according to the above procedure, detailed polymerization conditions and results being shown in Table I below. All of these runs were carried out under closely similar conditions, except that the reactor was brought up to the desired polymerization temperature in different ways. The heating schedules and temperatures employed, as well as their effect on reactor fouling are summarized in Table II.

*Table I*

| Run No. | 1 | 2 | 3 | 4 | 5 |
|---|---|---|---|---|---|
| Polymerization: | | | | | |
| Total Catalyst conc'n. Wt. percent | 0.23 | 0.12 | 0.12 | 0.12 | 0.15 |
| Al/Ti mol ratio | 1.9 | 2.0 | 2.0 | 2.0 | 2.0 |
| Temperature, °F | 153 | 195 | 150 | 148 | 151 |
| Pressure, p.s.i.g | 100 | 100 | 100 | 98 | 98 |
| Duration of Run, Hrs | 8 | 1 | 0.7 | 9 | 4 |
| Normal Reactor Residence Time, Hrs | 0.80 | 0.85 | 0.80 | 0.90 | 0.90 |
| Slurry Conc'n., Wt. percent Poly | 9.5 | | | 1.2 | 3.7 |
| Polymerization Results: | | | | | |
| Catalyst Efficiency, W./W | 32 | | | 10 | 24 |
| Reactor Rate, W./Hr./W | 40 | | | 11 | 27 |
| Conversion, Wt. percent | 77 | Low | Low | 12 | 37 |
| Polymer Inspections: | | | | | |
| Heptane Insolubles, Wt. percent | 63 | | | 58 | 66 |
| Density, gm./cc | 0.892 | | | 0.882 | 0.882 |

*Table II*

EFFECT OF HEATING OF POLYMER FOULING

| Run No. | Start-up Variable | Fouling Results |
|---|---|---|
| 1 | Catalyst slurry addition was begun at 80° F. Temperature of reactor contents was then rapidly raised to 150° F. (in about 15 min.) and maintained at that level. Maximum jacket temperature went to 210° F. for a short time, causing the reaction temperature to rise initially to 180° F. before leveling off at 150° F. It took about 20 minutes from the time the reaction mass temperature exceeded 150° F. until it was back under control at 150° F. Run length 8 hours. | No fouling whatever on jacketed section of reactor, sharply distinguished from unheated lower head which was fouled with a film deposit. Some strings formed on baffles and feed nozzles. |
| 2 | Catalyst slurry addition was begun at 200° F. and reactor temperature was then lowered to 150° F. for the remainder of the run. High reaction rate, but run had to be terminated in 1 hour. | Reactor became filled with stringy "birdnest" though no film fouling took place on the walls. Strings made agitation impossible. |
| 3 | Catalyst slurry addition was begun after reactor was lined out at 150° F. High reaction, but run length under 1 hour. | Similar to Run 2. Bad string formation. Reactor plugged completely in less than 1 hour. |
| 4 | Catalyst slurry addition was begun at 80° F. and temperature was slowly raised to 150° F. in the course of 1 hour. Jacket temperature never rose over 160° F. Good reaction. Run length 9 hours. | The reactor walls, baffles and agitator all were covered with a uniform, loosely cohesive soft film deposit, 1 inch thick. No string formation. |
| 5 | A heating coil was added to the lower unjacketed head. This run was started exactly as in Run 4 except that after the reactor was lined out at 150° F. the jacket and lower head were heated to 210° F. for 5 minutes. This caused the reactor temperature to rise to a maximum of 175° F. but it dropped back to 150° F. within 15 minutes after the start of the heat up. | Reactor was free of fouling. No string formation. (Run voluntarily terminated after 4 hours.) |

The tabulated data indicate that the type and extent of fouling encountered in the polymerization are greatly influenced by specific start-up procedures. String fouling is caused by the higher start-up temperatures (run 1 and especially runs 2 and 3), and film fouling by the lower start-up temperatures (run 1 and especially run 4). String fouling is caused particularly by the rapid initial polymerization that produces low molecular weight polymer when the active catalyst first contacts fresh monomer at relatively high temperature. At high initial temperatures the formed, low molecular weight polymer is highly solvated and is apparently pulled into filaments by the action of the revolving agitator. Such string fouling is very troublesome, but can be avoided by correct start-up, i.e. avoidance of high temperatures in the initial reaction stage (runs 4 and 5). Apparently the low temperature during start-up causes the fresh catalyst particles to become slightly coated with polymer and thus the extremely high initial activity of the catalyst is moderated. After the initial stage string fouling does not occur too readily, except when very high temperatures, such as 200° F., are maintained for substantial periods. The film fouling on start-up cannot be completely avoided, being apparently due to adsorption of catalyst particles on the walls and subsequent polymer formation around adsorbed catalyst. However, the present invention makes it possible to eliminate the fouling that does take place (runs 1 and 5). More specifically, by temporarily raising the wall temperature after the initial stage sufficiently to soften and solvate the deposited polymer film, it is thereafter readily sloughed off the walls by the turbulence of the agitated liquid reaction mixture. The necessary degree of this superheat depends somewhat, of course, on the solvent power of the particular diluent being used as well as the particular type of polymer being produced.

Once the reactor walls have thus been cleaned no appreciable further film deposition will occur during the main portion of the run even when the reactor wall is as much as 50° F. cooler than the exothermic reaction mixture. The fouling does not reform for two reasons. First, once equilibrium conditions have been reached and the reactor has been filled with a polymer slurry in place of the initial, essentially solids-free reaction mixture, the formed polymer particles represent a very large area compared to the reactor wall surface; any fouling polymer is then dispersed over all these surfaces. Indeed, for this reason it may sometimes be desirable to "seed" the reactor at the beginning of a run with a suitable amount of granulated polymer obtained in a previous run. Secondly, the eroding effect of the agitated polymer slurry scrubs fouling from the reactor walls. On the other hand, if the fouling film is not removed in the first place, polymer continues to grow on the fouled surfaces throughout the run. See run 4. However, if a substantial film deposit should eventually reform on the walls, it can again be removed by temporary superheating of the walls, without otherwise interrupting the process.

In sum, it has been discovered that troublesome string fouling can be avoided in this type of polymerization by the proper start-up procedure, i.e. lining out the feed rate of all the reactor contents at or near room temperature in correct proportion except either the monomer such as propylene or preferably the active catalyst concentrate such as the $TiCl_3$ slurry, then starting the addition of the final component (either the catalyst or the monomer) and then slowly heating the mixture to reaction temperature over a period of about ½ to one hour. Thereafter a sudden heat surge is applied to the reactor walls to soften and slough off the film deposited in the initial stage, whereupon the reaction is stabilized at the desired normal polymerization temperature for the remainder of the run. Alternatively it is possible to use a two-stage reactor, the first stage desirably being smaller than the second. In starting up such a system, the first stage is maintained at low temperature, e.g. 80° to 90° F., while the second is maintained at the normal polymerization temperature, e.g., 150°–170° F., all feed components being fed to the first stage only. However, in such a system there may be a tendency for the polymer to foul the walls of the first stage and accordingly it may be desirable to start introducing all feed components directly into the main, second stage after equilibrium conditions have been established. The first stage can then be cleaned by solvating the fouling deposit with hot diluent, preferably in the absence of catalyst or monomer.

The basic principle of the present invention is applicable to any slurry polymerization where the polymer deposit is capable of solvation by the diluent at temperatures above normal polymerization temperature. The invention is particularly valuable in polymerization processes which are susceptible to wall fouling as well as string formation in the catalytically most active start-up period.

Having described the general nature of the invention as well as illustrative embodiments thereof, its actual scope is particularly pointed out in the appended claims.

The claimed invention is:

1. In a process for minimizing the fouling effects in a continuous polymerization of an olefinic hydrocarbon wherein liquid olefinic feed, an inert organic diluent which is liquid at reaction conditions and a polymerization catalyst are continuously introduced into and agitated in a polymerization zone enclosed by solid surfaces and normally maintained at a fixed polymerization temperature in the range of 30° to 200° F. and pressure, a turbulent reaction mixture containing a slurry of solid polymer suspended in liquid feed components is formed in said zone and a fouling polymer is deposited on said surfaces, and said slurry is continuously removed from said zone, the improvement which comprises temporarily applying excess heat to the exterior of said polymerization zone so as to heat the interior wall surface of the polymerization zone to a temperature in the range of 200° to 400° F. and sufficient to heat said polymer deposit on said surfaces sufficiently to soften it but not so much as to heat the agitated reaction mixture more than about 50° F. above said normal, fixed polymerization temperature, all the while continuing the introduction of feed and catalyst into the polymerization zone, agitating the reaction mixture and removing the polymer slurry therefrom, maintaining the excess heat until the softened polymer deposit is sloughed off into the turbulent reaction mixture, and then readjusting the external heat transfer to the polymerization zone to restore the aforementioned fixed polymerization temperature in the reaction mixture.

2. A process according to claim 1 wherein said feed comprises a $C_2$–$C_8$ alpha-olefin, said catalyst comprises a subtetravalent titanium chloride and an aluminum alkyl compound, said fixed polymerization temperature is in the range between 30° and 200° F., polymerization pressure is between 0 and 10 atmospheres and sufficient to maintain the diluent in liquid phase and a 2 to 10% concentration of olefin therein, and the excess heat is applied for a period ranging from about 0.5 to 30 minutes so as to increase the temperature of said polymer deposit to a maximum of about 40° to 100° F. above said polymerization temperature.

3. A process according to claim 2 wherein said olefin is propylene.

4. A process according to claim 2 wherein the catalyst comprises the titanium chloride and aluminum triethyl in a mole ratio of about 0.5:1 to 5:1.

5. A process according to claim 2 wherein, while said excess heat is temporarily applied, the reaction pressure is suddenly reduced sufficiently to cause vaporization of liquid next to said externally heated reaction zone surfaces, but not enough to cause boiling of the main body of reaction mixture, and thereafter restoring the normal polymerization pressure.

6. A process according to claim 2 wherein the diluent is a $C_3$–$C_{18}$ paraffin.

7. A process according to claim 2 wherein the diluent is a $C_6$–$C_8$ aromatic.

8. A process according to claim 2 wherein the diluent is a cycloparaffin.

9. An improved startup procedure for a polymerization process wherein a solid plastic material is made by continuous polymerization of propylene at a normal polymerization temperature of about 120° to 170° F. and a pressure of about 0 and 150 p.s.i.g. in an enclosed reaction zone in the presence of a large excess of an inert diluent selected from the group consisting of paraffins and aromatics of 6 to 8 carbon atoms which are liquid at reaction conditions, and in the further presence of a catalyst comprising a combination of titanium trichloride and aluminum triethyl in a proportion corresponding to an Al/Ti atom ratio of 1:1 to 3:1 and wherein a polymer deposit tends to form on surfaces defining said reaction zone, which procedure comprises starting to feed said propylene and diluent at a relatively low temperature between about 60° and 100° F. into said reaction zone, steadying the propylene and diluent feed rates and product slurry withdrawal rate at desired values, the propylene and diluent being fed in a ratio adapted to yield a reaction mixture containing about 2 to 25% propylene, starting to feed said catalyst as a slurry in diluent into said reaction zone at a steady rate corresponding to about 0.05 to 0.5% based on total liquid feed, agitating and gradually heating up the reaction zone contents over a period of about 30 to 60 minutes to a temperature between about 120° and 180° F., thereafter rapidly applying additional external heat to said reaction zone for a period of about 0.5 to 30 minutes to increase the temperature of the interior wall surface of the polymerization zone to a temperature in the range of 200° to 400° F. and sufficient to heat said fouling polymer deposit sufficiently to cause it to slough off said reaction zone surfaces into the turbulent liquid reaction mixture, but not enough to cause the temperature of said turbulent liquid reaction mixture to rise more than about 30° F. above said normal polymerization temperature, and thereafter steadying said process at said normal polymerization temperature.

10. A process according to claim 9 wherein the rapid external heating is accomplished with the aid of superheated steam.

11. A process according to claim 9 wherein said temporary additional external heat is applied to all reaction zone surfaces wetted by said polymerizable reaction mixture.

12. A process according to claim 9 wherein the diluent is normal heptane.

13. A process according to claim 9 wherein the diluent is xylene.

References Cited in the file of this patent

UNITED STATES PATENTS 2,840,551    Field et al. _____ June 24, 1958